US 9,258,064 B2

(12) United States Patent
Barnett et al.

(10) Patent No.: US 9,258,064 B2
(45) Date of Patent: Feb. 9, 2016

(54) LIGHT EMISSION CIRCUIT

(71) Applicant: ICONIC SOUND LIMITED, London (GB)

(72) Inventors: Danielle Barnett, Essex (GB); David Holmes, Essex (GB); Michael Andrew Kellett, Dalbeattie (GB)

(73) Assignee: Iconic Sound Limited (GB)

( * ) Notice: Subject to any disclaimer, the term of this patent is extended or adjusted under 35 U.S.C. 154(b) by 134 days.

(21) Appl. No.: 14/170,417

(22) Filed: Jan. 31, 2014

(65) Prior Publication Data
US 2015/0037047 A1    Feb. 5, 2015

(30) Foreign Application Priority Data

Aug. 1, 2013 (GB) .................................. 1313788.0

(51) Int. Cl.
*H04B 10/50* (2013.01)
*H04B 10/564* (2013.01)
*H04B 10/25* (2013.01)
*H04B 10/40* (2013.01)
*H04B 10/54* (2013.01)

(52) U.S. Cl.
CPC .............. *H04B 10/564* (2013.01); *H04B 10/25* (2013.01); *H04B 10/40* (2013.01); *H04B 10/50* (2013.01); *H04B 10/502* (2013.01); *H04B 10/54* (2013.01)

(58) Field of Classification Search
CPC ........ H04B 10/25; H04B 10/40; H04B 10/50; H04B 10/502; H04B 10/564
See application file for complete search history.

(56) References Cited

U.S. PATENT DOCUMENTS

| 2006/0255746 | A1  | 11/2006 | Kumar et al. |
| 2008/0187324 | A1  | 8/2008  | Akiyama et al. |
| 2012/0081016 | A1* | 4/2012  | Wu ................. H05B 33/0827 315/192 |
| 2014/0139112 | A1* | 5/2014  | Shteynberg .......... H05B 33/083 315/122 |

FOREIGN PATENT DOCUMENTS

| EP | 0201370 A1   | 11/1986 |
| EP | 0878882 A2   | 11/1998 |
| JP | S62256538 A  | 11/1987 |
| WO | WO82/02632 A1 | 8/1982 |
| WO | WO 2007/031794 A1 | 3/2007 |

OTHER PUBLICATIONS

European Search Report on related EP Application No. 14152033 dated Aug. 14, 2014.
UK Search Report on related UK Application No. GB1313788.0 dated Jan. 14, 2014.

* cited by examiner

*Primary Examiner* — Leslie Pascal
(74) *Attorney, Agent, or Firm* — Klein, O'Neill & Singh, LLP

(57) ABSTRACT

Apparatus comprises first and second light sources driven respectively by second and third inverting amplifiers with feedback from the first and second light sources to provide signal content respectively on positive and negative phases of an input signal; and a bias control arrangement configured to measure a bias level of one of the light sources and to bias the second and third amplifiers based on the measured bias level.

19 Claims, 4 Drawing Sheets

LIGHT EMISSION CIRCUIT

CROSS REFERENCE TO RELATED APPLICATIONS

This application claims priority to and the benefit of United Kingdom Patent Application No. 1313788.0, filed in the United Kingdom Patent Office on Aug. 1, 2013, the disclosure of which is incorporated herein by reference.

FIELD OF THE INVENTION

This invention relates to a light emission circuit.

BACKGROUND OF THE INVENTION

In a concert or studio environment, it is usual to connect sound sources, including guitars and microphones, to amplification equipment with shielded electrical cables. Such cables have a copper core and a metallic shield separated by an insulating material. At each end, a jack or plug, typically ¼ inch (6.35 mm) diameter, allows both the copper core and the shielding of the cable to be electrically connected to electronic circuitry in the relevant electrical equipment. Signals are carried from the sound source in the same form in which they are generated, i.e. as analogue signals in the audible frequency range 20 Hz to 20 kHz. In a studio environment, the same type of cable connects sound sources to mixing desk equipment. Cables used in concert environments can be over 10 m long, although shorter cables tend to be used in studio environments.

Such cables can become internally damaged during use, especially when being used in an on-stage environment, although they may appear externally to be undamaged. Damaged cables cause a reduction in the quality of signals being carried, and may result in unwanted distortion or other degradation of the audio signals. If the core of the cable becomes fractured, the cable can stop functioning altogether, although signal deterioration is more common. The inventor considers that signal degradation might result from fractures in the core and/or shielding and/or from damage to the insulating material separating the core from the shielding resulting in unwanted inductances and/or capacitances, which can cause unwanted resonance and/or filtering when supplied with energy in the form of the audio signals being carried.

The effects of cable damage can be avoided through the use of radio links between the sound source and the mixing desk or amplification equipment. Radio microphones are well known. However, the possibility of radio interference means that digital communication links are more reliable. However, many musicians and sound producers prefer audio signals not to be digitised at any point in their transmission on the basis that this results in a reduction in quality, as well as a less pure sound.

WO2007/031794 discloses arrangements that mitigate these disadvantages. The present invention builds upon the arrangements disclosed in WO2007/031794.

SUMMARY OF THE INVENTION

A first aspect of the invention provides apparatus comprising:
 first and second light sources (LED1, LED2);
 a first transistor (Q1) having first and second main electrodes and a control electrode;
 a second transistor (Q2) having first and second main electrodes and a control electrode;
 a first amplifier (U1) having first and second inputs and an output;
 a second amplifier (U2) having an input and an output;
 a third amplifier (U3) having an input and an output; and
 a bias control arrangement having an input and an output; wherein:
 the first light source (LED1) and the first and second main electrodes of the first transistor (Q1) are connected in series in a path between a positive supply terminal and a first node,
 the second light source (LED2) and the first and second main electrodes of the second transistor (Q2) are connected in series in a path between the first node and a negative supply terminal,
 the first node is connected to a second input of the first amplifier (U1),
 the input of the second amplifier is connected to the output of the first amplifier,
 the output of the second amplifier is connected to the control input of the first amplifier,
 the input of the third amplifier is connected to the output of the first amplifier,
 the output of the third amplifier is connected to the control input of the second transistor,
 the input of the first amplifier is connected to a signal input terminal (INPUT),
 the input of the bias control arrangement is connected to a second node in the path through the first and second light sources and the first and second transistors,
 the bias control arrangement is configured to measure bias at its input and provide a control bias signal at its output, and
 the output of the bias control arrangement is connected to the input of each of the second and third amplifiers.

The output of the bias control arrangement may be connected to the input of each of the second and third amplifiers via an arrangement comprising a fourth amplifier (U4) and a buffer (U5). Here, the output of the bias control arrangement may be connected to an input of the buffer (U5), wherein an output of the buffer may be connected to the input of the third amplifier (U3) and to an input of the fourth amplifier (U4), and wherein an output of the fourth amplifier (U4) may be connected to the input of the second amplifier (U2).

The apparatus may comprise a first resistor connected directly to the first node and in the path to the positive supply terminal and a second resistor connected directly to the first node and in the path to the negative supply terminal, and wherein the second node may be connected to the first node by either the first resistor or the second resistor.

The bias control arrangement may include a microprocessor. The microprocessor may be configured to monitor signals received at the signal input terminal and is configured automatically to power down in response to detecting no significant input signal for a period of time.

The bias control arrangement may have a second input that is connected to the input of the first amplifier, and the bias control arrangement may be configured to calculate the bias control signal based on instances when the level of the signal at the second input is low and to refrain from calculating the bias control signal based on instances when the level of the signal at the second input is not low.

The bias control arrangement may be configured to provide at its output a pulse width modulated signal having a duty cycle that is a function of the measured bias.

A second aspect of the invention provides apparatus comprising:
 first and second light sources driven respectively by second and third inverting amplifiers with feedback from the first and second light sources to provide signal content respectively on positive and negative phases of an input signal; and a bias control arrangement configured to measure a bias level of one of the light sources and to bias the second and third amplifiers based on the measured bias level.

The output of the bias control arrangement may be connected to the second and third amplifiers via an arrangement comprising a fourth amplifier and a buffer. Here, the output of the bias control arrangement may be connected to an input of the buffer, an output of the buffer may be connected to the input of the third amplifier and to an input of the fourth amplifier, and an output of the fourth amplifier may be connected to the input of the second amplifier.

The bias control arrangement may include a microprocessor. The microprocessor may be configured to monitor the input signal terminal and is configured automatically to power down in response to detecting no significant input signal for a period of time.

The bias control arrangement may be configured to calculate a bias control signal provided to the second and third amplifiers based on instances when the level of the input signal is low and to refrain from calculating the bias control signal based on instances when the level of the input signal is not low.

The bias control arrangement may be configured to provide to the second and third amplifiers a pulse width modulated signal having a duty cycle that is a function of the measured bias.

The apparatus may comprise an electrical connector, for instance a jack plug, for receiving an electrical input signal.

A third aspect provides a cable arrangement comprising first and second devices connected by a dual core optical waveguide, wherein the first device comprises such apparatus.

These and other aspects of the invention are more fully comprehended upon review of this disclosure.

BRIEF DESCRIPTION OF THE DRAWINGS

Embodiments of the invention will now be described by way of example only with reference to the accompanying drawings, in which.

DETAILED DESCRIPTION OF EMBODIMENTS

Figure 1:
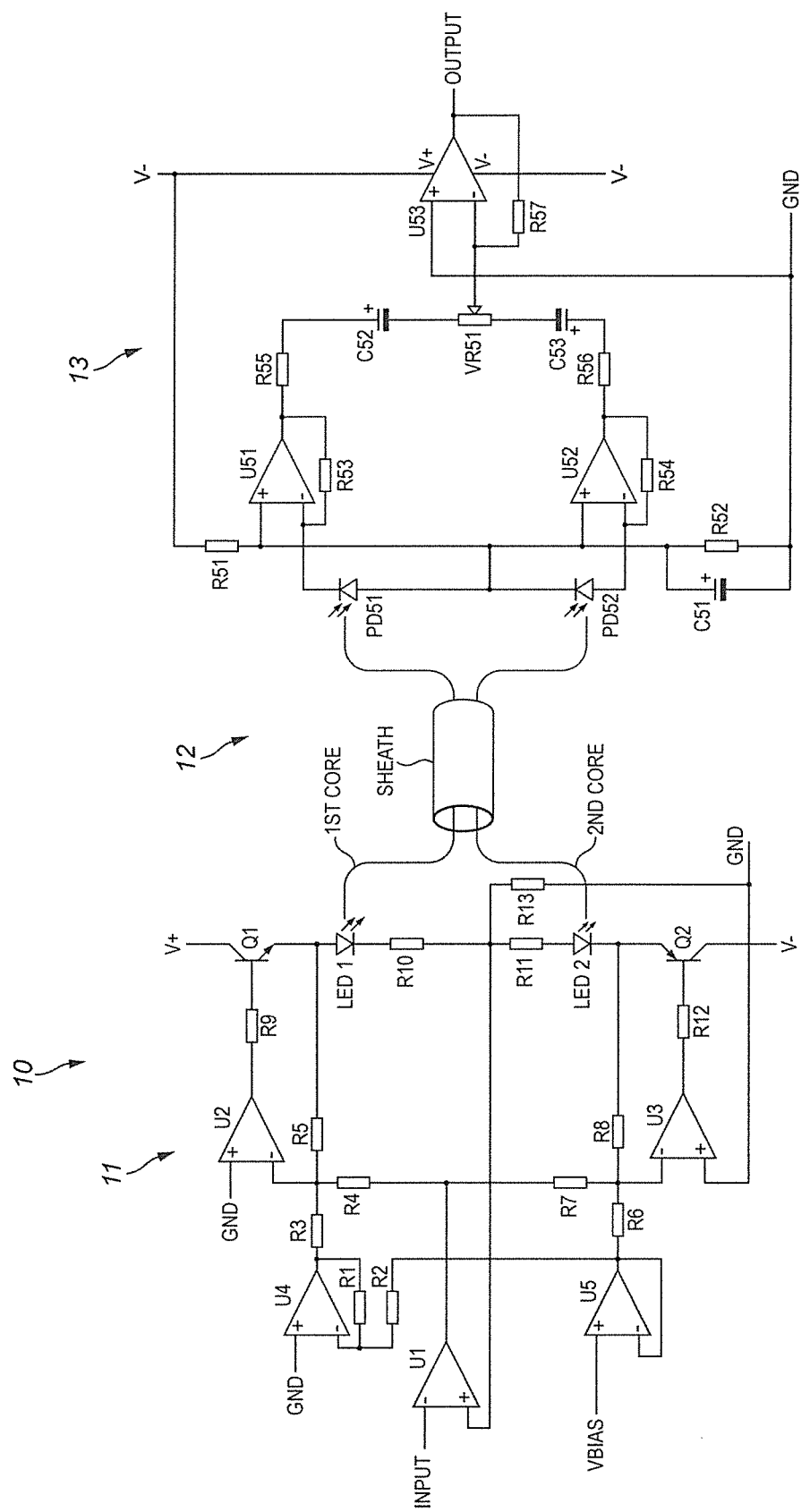
FIG. 1 is a schematic drawing of circuitry used to communicate electrical audio signals in optical form, according to certain aspects of the invention.

Reference will firstly be made to FIG. 1, which is a schematic diagram illustrating components of a system 10. The system includes a transmitter 11, an optical cable 12 and a receiver 13.

In brief, the transmitter circuit 11 is arranged to receive electrical signals at audio frequencies, to provide an amplitude modulated optical signal over first and second cores of an optical cable 12, and the receiver 13 is arranged to demodulate the optical signals and to reproduce the original electrical signal. This specification is concerned primarily with the transmitter circuit 11.

Firstly, the arrangement of components within the transmitter circuit 11 will be described.

The transmitter circuit 11 includes first to fifth operational amplifiers (op-amps) U1 to U5. Each of the op-amps has an inverting input, a non-inverting input and an output.

The first op-amp U1 is an input amplifier, and acts as a buffer. The input amplifier U1 is connected to receive an input electrical signal supplied at an INPUT terminal at its inverting input. The non-inverting input of the first op-amp U1 is connected to a node in a chain between positive and supply negative terminals, as is described in more detail below. Although not shown, buffering and filtering components are provided to process a received signal before application to the INPUT terminal.

The chain includes, in sequence from the positive supply terminal: collector and emitter electrodes of a first transistor Q1, anode and cathode terminals of a first light source LED1, a tenth resistor R10, an eleventh resistor R11, a second light source LED2 and collector and emitter electrodes of a second transistor Q2. The first transistor Q1 is an NPN transistor, and the second transistor Q2 is a PNP transistor. The non-inverting input of the first amplifier U1 is connected at the node between the tenth and eleventh resistors R10, R11. This node is also connected to ground potential by a thirteenth resistor R13. The light sources here are light emitting diodes.

The base electrode of the first transistor Q1 is connected to an output of the second op-amp U2 by a ninth resistor R9. Similarly, the base electrode of the second transistor Q2 is connected to the output of the third op-amp U3 by a twelfth resistor R12. The non-inverting inputs of the second and third op-amps U2 and U3 are connected to ground potential GND. The inverting input of the second op-amp U2 is connected to the output of the first op-amp U1 by a fourth resistor R4. The inverting input of the third op-amp U3 is connected to the output of the first op-amp U1 by a seventh resistor R7. The inverting input of the second op-amp U2 is also connected to the node between the first transistor Q1 and the first light source LED1 by a fifth resistor R5. The inverting input of the third op-amp U3 is connected to the node between the second light source LED2 and the second transistor Q2 by an eighth resistor R8.

A biasing arrangement is provided by the fourth and fifth op-amps U4 and U5.

The output of the fifth op-amp U5 is connected to the inverting input of the third op-amp U3 by a sixth resistor R6. The inverting input of the fifth op-amp U5 is connected directly to the output of the fifth op-amp, and is connected to the inverting input of the fourth op-amp U4 by a second resistor R2. The first resistor R1 is connected between the output and inverting INPUT terminals of the fourth op-amp U4. The output of the fourth op-amp U4 is also connected to the inverting input of the second op-amp U2 by a third resistor R3. The non-inverting input of the fourth op-amp U4 is connected to ground potential. The non-inverting input of the fifth op-amp U5 is connected to receive a bias Voltage signal VBIAS.

The first and second cores of the optical fibre cable arrangement 12 are connected to respective ones of the first and second light sources LED1 and LED2. The first and second cores are contained within a sheath, which is indicated schematically in the figure. At the receiver 13, the first core of the optical fibre 12 is connected to a first photodiode PD51 and the second core is connected to a second photodiode PD52.

The output signal from the first photodiode PD51 is amplified by a first receiver op-amp U51. A second receiver op-amp U52 is provided to amplify the signal provided by the second photodiode PD52. Outputs of the first and second receiver op-amps U51 and U52 are summed at a potentiometer VR51, and the result is amplified by a third receiver op-amp U53.

In the transmitter circuit 11, the first and second resistors R1 and R2 may have the same value. Also, each of the third to eighth resistors R3 to R8 may have the same value as one another. The ninth and twelfth resistors R9 and R12 may have the same value, which may for instance be 100Ω. The tenth and eleventh resistors R10, R11 may have the same value, which may for instance be 10Ω. The thirteenth resistor R13 may also have a value of 10Ω.

Operation of the transmitter circuit 11 will now be described.

In brief, the second and third op-amps U2 and U3 drive the first and second light sources LED1 and LED2 respectively. The light sources are driven based on the input signal received at the inverting input of the first op-amp U1. The second op-amp U2 drives the first light source 1 to provide illumination at a level that is directly proportional to the input Voltage for one half of the waveform of the input Voltage, and the third op-amp U3 drives the second light source LED2 to provide an illumination at a level proportional to the Voltage of the input signal for the other half of the waveform. It can be visualised that the first light source LED1 provides the positive part of the input signal and the second light source LED2 provides the negative part of the input signal. When the input signal is negative, the first light source LED1 provides substantially no signal content, and when the input signal is positive, the second light source LED2 provides substantially no signal content.

Assuming that the value of a VBIAS applied to the non-inverting input of the fifth op-amp U5 is zero Volts, the outputs of the fourth and fifth op-amps U4 and U5 are also 0. When the input signal has a positive value, the output of the first op-amp U1 becomes more negative, which in turn causes the outputs of the second and third op-amps U2 and U3 to become more positive. This causes the current flowing in the first light source LED1 to increase and the current flowing in the second light source LED2 to decrease.

In turn, this causes the current flowing through the collector-emitter path of the first transistor Q1 through the tenth resistor R10 and into the thirteenth resistor R13 to increase. This causes a positive Voltage to appear across the thirteenth resistor R13. The action of the feedback connection from the thirteenth resistor R13 to the non-inverting input of the first op-amp U1 results in the Voltage across the thirteenth resistor R13 following the input Voltage at the inverting input of the first op-amp U1. Since the Voltage across the thirteenth R13 is proportional to the current flowing though it and thus through the conducting one of the first and second light sources LED1, LED2 the current through the conducting light source LED1 or LED2 is caused to be proportional to the Voltage at the input of the first op-amp U1. As such, this arrangement provides a feedback signal to the first op-amp U1 that is proportional to the current in the light sources LED1 and LED2.

When the input signal is negative, a similar process results in current flowing through the first resistor R1, the second light source LED2 and the second resistor Q2, resulting in a negative Voltage across the thirteenth resistor R13.

With a value of VBIAS at zero Volts, the crossing of the signal supplied at the INPUT terminal from positive to negative or from negative to positive would require the output of the second and third op-amps U2 and U3 to make large steps for the respective light source LED1 or LED2 to start conduction.

Disregarding the effects of errors and offsets in the op-amps and assuming zero bias provided by the fourth and fifth op-amps U4 and U5, the output of the first op-amp U1 is zero if its input is zero, and the outputs of the second and third op-amps are also 0. In this condition, the first and second transistors Q1 and Q2 are turned off, that is they are non-conducting, and there is no current in either of the light sources LED1 and LED2 and there is a zero Voltage across the thirteenth resistor R13. If even a very small input Voltage is applied at the input, the feedback loop requires that one of the transistors Q1 and Q2 be turned on to drive current through one of the light sources LED1 or LED2. This requires a Voltage of about +/−2 Volts at the output of the second or third op-amp U2 or U3 according to the polarity of the input. Typically, with real components, the outputs of the second and third op-amps U2 and U3 need only to change by a further 0.5 Volts to 0.7 Volts for the maximum signal that the transmitter circuit 11 can handle.

Figure 2:
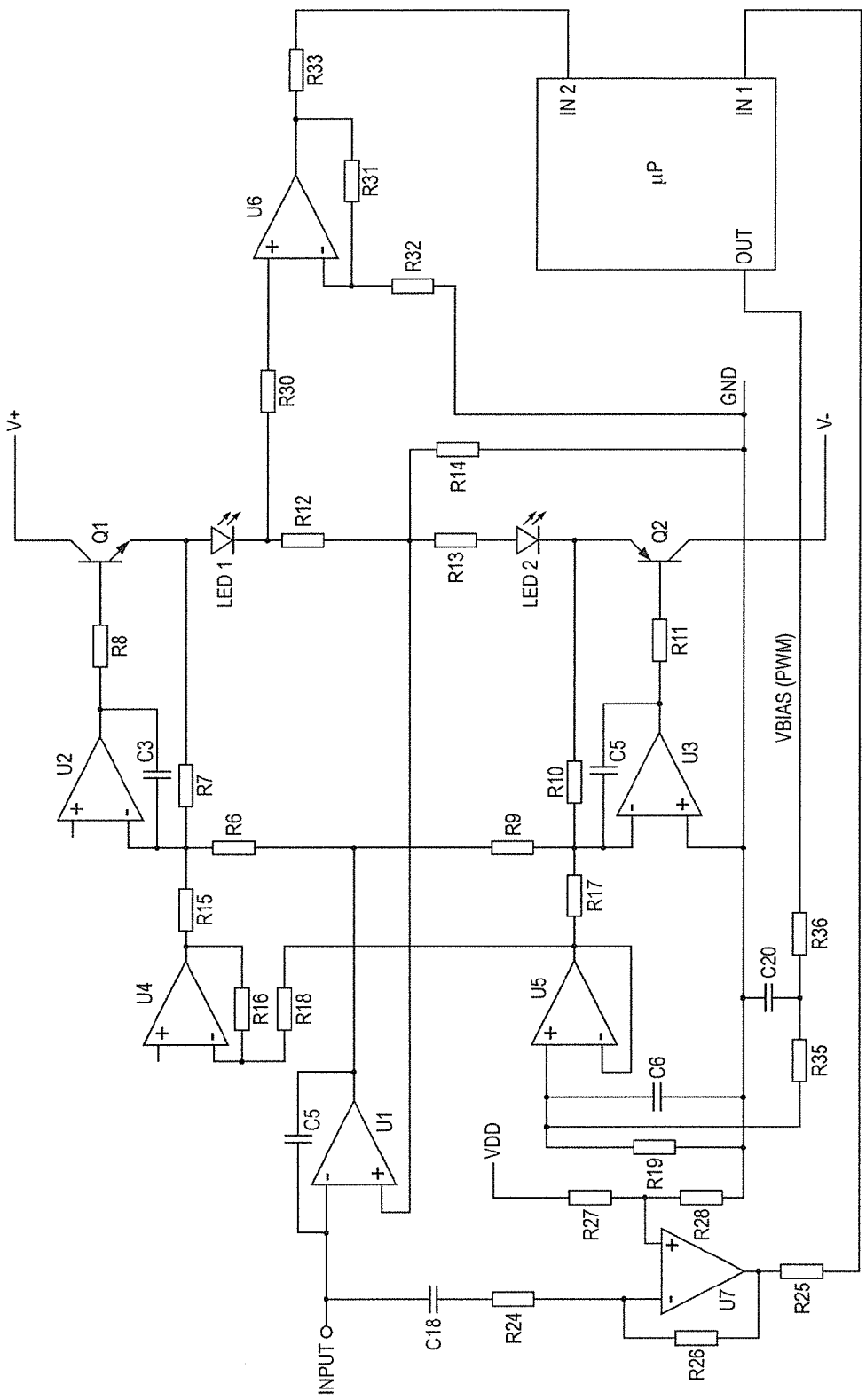
FIG. 2 is a schematic drawing of transmitter circuitry of FIG. 1, according to certain aspects of the invention.

The need for the provision of large steps in Voltage by the second and third op-amps U2 and U3 is avoided by the biasing arrangement shown in FIG. 1 and shown in more detail in FIG. 2.

In particular, a bias current for the first and second light sources LED1 and LED2 is generated by the biasing circuit formed by the fourth and fifth op-amps U4 and U5. In particular, a Voltage approximately equal to the forward Voltage of the light sources LED1 and LED2 is applied to the VBIAS input, which is the non-inverting input of the fifth op-amp U5. This causes the output of the fifth op-amp U5 to be equal to the Voltage of VBIAS and causes the output of the fourth op-amp U4 to be equal to the negative Voltage, i.e. −VBIAS.

Acting through the third and sixth resistors R3 and R6, the signals on the outputs of the fourth and fifth op-amps U4 and U5 cause the third op-amp U3 to drive the base of the second transistor Q2 negative until the Voltage on the cathode of the second light source LED2 is −VBIAS and cause the output of the second op-amp U2 to be driven positive until the Voltage on the anode of the first light source LED1 is equal to VBIAS.

The use of two light sources driven by two different amplifiers to generate signals on different phases of the input signal results in a doubling of the dynamic range, compared to the situation where a single light source is used. This advantage is achieved at the expense of an additional core required for the optical cable 12. However, this is considered to be an acceptable downside considering the performance advantages that result from the increased dynamic range.

The present embodiment provides a Voltage adjustment arrangement by which it is possible to adjust the current flowing through the light sources LED1 and LED2 in the absence of a signal at the input to a value that is suitable to reduce non-linearity whilst not consuming excessive power.

Through the use of a bias Voltage adjustment arrangement, differences in forward Voltage for different light sources, resulting from different temperatures of operation and also from manufacturing tolerances, can be accommodated.

In the embodiments described herein, this is achieved by measuring the bias current that flows through the light sources LED1 and LED2 and by adjusting the Voltage of the signal at VBIAS to maintain the bias current at the required level.

Moreover, the bias Voltage adjustment arrangement biases two separate amplifiers U2 and U3, and their associated light sources LED1 and LED2, in a balanced fashion using only one input VBIAS.

FIG. 2 shows the transmitter circuit arrangement 11 in more detail. Reference numerals are re-used from Figure for like elements. The additional elements that are shown in FIG. 2 but are not shown in FIG. 1 will now be described.

The main additional component is a microprocessor μP. The microprocessor μP is configured to measure the bias current flowing through the light sources and to provide a Voltage at VBIAS that is appropriate to achieve the required bias current level.

The microprocessor μP has two analogue inputs In1 and In2. The first input In1 is connected to sample the signal at the INPUT terminal. The second input In2 of the microprocessor μP is connected to sample the Voltage at a node in the chain including the first and second light sources LED1 and LED2.

In particular, the INPUT terminal is connected to an inverting input of a seventh op-amp U7 via an eighteenth capacitor C18 and a twenty-fourth resistor R24. The output of the seventh op-amp U7 is connected to the first input In1 of the microprocessor μP by a twenty-fifth resistor R25. A twenty-sixth resistor R26 is connected between the inverting input and output terminals of the seventh op-amp U7. The non-inverting input of the seventh op-amp U7 is connected to the mid-point of a potential divider formed by twenty-seventh and twenty-eighth resistors R27 and R28 connected between a second supply potential VDD and ground potential GND.

The node between the cathode of the first light source LED1 and the twelfth resistor R12 is connected to the non-inverting input of a sixth op-amp U6 by a thirtieth resistor R30. The inverting input of the sixth op-amp U6 is connected to ground potential GND by a thirty-second resistor R32. A thirty-first resistor R31 is connected between the output and inverting INPUT terminals of the op-amp U6. The output of the sixth op-amp U6 is connected to the second input In2 of the microprocessor μP by a thirty-third resistor R33.

An output Out of the microprocessor μP is connected to the non-inverting input of the fifth op-amp U5 as VBIAS. The output Out of the microprocessor μP is an analogue output. The output Out of the microprocessor μP is connected in particular by an RC circuit comprised of three resistors R19, R35 and R36 and two capacitors C6 and C20. The RC circuit does not include any series capacitors, which would block DC, but includes a capacitor connected to ground potential GND.

Also, capacitors are connected across the outputs and inverting inputs of the second and third op-amps U2 and U3. These capacitors control the bandwidth of the amplifiers provided by the second and third op-amps U2 and U3.

A signal of maximum amplitude approximately 1.2 Volts peak to peak is presented at the INPUT terminal. Because the twelfth, thirteenth and fourteenth resistors R12 to R14 are all 10Ω resistors, the maximum peak current through the first and second light sources LED1 and LED2 is about 60 mA.

The microprocessor μP is configured to adjust the bias Voltage applied to the non-inverting input of the fifth op-amp U5 by measuring the bias current as follows.

The bias current flowing through the light sources LED1 and LED2 results in a Voltage across the twelfth resistor R12. In the absence of any Voltage on the INPUT terminal, the feedback loop from the node between the twelfth and thirteenth resistors R12 and R13 to the non-inverting input of the first op-amp U1 ensures that the Voltage at the node between the resistors R12 and R13 is 0. As such, the Voltage at the node between the twelfth resistor R12 and the first light source LED1 is a function only of the bias current. The Voltage at this node is amplified by the sixth op-amp U6, having a gain determined by the values of the thirty-first and thirty-second resistors R31 and R32. The resulting amplified signal is proportional to the bias current. This signal is provided to the second input In2 of the microprocessor μP. The second input In2 is an analogue to digital converter (ADC) input. Consequently, the microprocessor μP is provided with digital values (data) that is indicative of the Voltage at the node between the twelfth resistors R12 and the first light source LED1, which is proportional to the current flowing through the first light source LED1 in the absence of a Voltage at the INPUT terminal.

The microprocessor μP is configured to sample the signal at the second input In2 at a high rate, for instance 1000 samples per second. Whenever the microprocessor μP determines that the level of the signal received at the second input In2 is sufficiently low that the signal induced current in one of the light sources LED1 and LED2 is below a predetermined threshold, the bias current is estimated. The bias current is estimated by processing the digitised value resulting from the Voltage at the second input In2 of the microprocessor μP. The threshold is chosen to have any suitable value. The threshold may be for instance 20% of the desired bias current. A low threshold may result in the bias current not being adjusted for long periods of time in normal use, but a high threshold may result in the processor incorrectly estimating and adjusting the bias current due to signal induced currents in the twelfth resistor R12. A suitable threshold results in bias current adjustment at suitably short intervals without providing sensitivity to signal induced currents in the twelfth resistor R12.

The microprocessor μP is configured to filter the estimated bias current values. The filtered estimates are used to drive a digital feedback loop that is implemented in software in the microprocessor μP, an output of which provides a digital value that represents the value of VBIAS that is needed to provide the desired bias current through the light sources LED1 and LED2. In designing the software, an ideal bias current is chosen based on the need to extend battery life (which tends towards a low bias current) and achieving acceptable sound quality (based on measurements of signal distortion and listening tests). The software integrates the estimated bias current measurement over time, taking new samples when the signal is below the threshold, as discussed above, and adjusts the PWM output to increase or decrease the bias current so as to cause the integrated measurement to approach the ideal.

The value indicative of the desired level of VBIAS is used by the microprocessor μP to provide at the output Out a pulse width modulated (PWM) signal having a duty cycle that is representative of the value of VBIAS. The PWM signal is then filtered by the RC arrangement comprising the resistors R19, R35 and R36 and the capacitors C6 and C28 such as to provide a substantially DC (direct current) signal to the non-inverting input of the fifth op-amp U5.

The transmitter circuit provides particularly good noise performance, in large part because of the large peak LED current. The large peak LED current is possible because of the dual drive mechanism provided by the connection of the second and third op-amps U2 and U3 as inverting amplifiers with feedback from the node in the path including the light sources LED1 and LED2. This allows the current to be swung with a very low bias current. Taking the example of swinging the current through 120 mA, this can be achieved with about 5 mA of bias current. Achieving the same with a class A circuit design would require 130 mA of bias current, which would present a very high draw on battery. Consequently a class A design would typically use a lower bias current, e.g. 40 mA bias current, which would reduces the peak signal (by about two thirds, or 10 dB) which worsens noise by about 10 dB. The dual drive mechanism of the transmitter circuit 11 reduces power consumption whilst increasing the signal-to-noise ratio.

Moreover, in the transmitter circuit 11 bias voltages are injected from a single positive bias source, namely the output Out of the microprocessor. This is possible because of the arrangement of the fourth and fifth op-amps U4 and U5, and is possible of the connection of the second and third op-amps U2 and U3 as inverting amplifiers with feedback from the node in the path including the light sources LED1 and LED2. The microprocessor μP is configured to examine signals received at the first input In1. The first input In1 is an ADC input, and the microprocessor μP generates and processes digital values that are representative of the analogue Voltage received at the first input In1. By virtue of the arrangement of the seventh op-amp U7, the analogue Voltage present at the first input In1 of the microprocessor μP is representative of the Voltage at the INPUT terminal.

The microprocessor μP is configured to detect from signals received at the first input In1 when there has been any significant signal received at the INPUT terminal. The microprocessor μP is configured to respond to determining that no significant signal has been present at the INPUT terminal for a predetermined period of time by powering down the transmitter circuit 11, in particular by powering down the microprocessor μP and ceasing to provide supply Voltage to the Voltage terminals V+ and V−. The significant period of time may for instance be 60 seconds, 300 seconds, 600 seconds etc.

In this way, the transmitter circuit 11 can experience reduced power consumption, because the transmitter circuit 11 is powered down and thus does not consume power when it is not in use. This can be convenient for the user, who thus does not need to remember to turn off the transmitter circuit 11 after use. The user may turn the transmitter circuit 11 on through the use of a hardware switch (not shown).

The microprocessor μP may determine that an insignificant level of signal is present at the INPUT terminal if the level of signal does not exceed a threshold, or does not exceed a threshold for a threshold period of time. The threshold may for instance be 0.5%, 1% or 2% of the maximum signal level, so 0.003, 0.006 or 0.012 Volts respectively, or in the range of 0.5-2% of the maximum signal level. The threshold period of time may for instance be a tenth of a second.

It will be appreciated that the above-described embodiments are merely illustrative and are not limiting on the scope of the claims. Various alternatives will be envisaged by the skilled person, and some will now be described.

Instead of using the microprocessor μP to measure the bias current and to provide the bias signal VBIAS, these functions could instead be performed by a circuit of analogue components. Using a microprocessor is advantageous in that relatively sophisticated processing can be implemented relatively easily. Also, using a microprocessor as described in the embodiments provides the additional advantage that the microprocessor μP can also be used to determine when no significant input signal is present and to power down the transmitter circuit 11 accordingly. This function would be expensive to achieve using analogue components.

Instead of using a Voltage at a terminal of one of the light sources LED1 and LED2 to allow measurement of the bias current through the light sources, other arrangements are possible. For instance, in other embodiments the Voltage across the tenth and eleventh resistors R10 and R11 are measured in order to measure the bias current. When the Voltage across the tenth and eleventh resistors R10 and R11 are equal and opposite, the sum of their absolute magnitudes corresponds directly with the bias current. The Voltages across the tenth and eleventh resistors R10 and R11, and the calculation of the bias current, may be performed by a microprocessor, by analogue circuitry or by a mixture of analogue and digital circuits.

In the above embodiments, the signal at the second input In2 of the microprocessor μP is sampled 1000 times per second. In other embodiments, the signal of the second input In2 is sampled at a much higher frequency, in particular at a frequency that is significantly higher than the maximum frequency of the audio signals that are received at the INPUT terminal. In these embodiments, the bias current through the first and second light sources LED1 and LED2 can be measured and a Voltage for the signal VBIAS calculated every time that the input signal passes through zero Volts. Better performance is achieved in these embodiments, although at the cost of an increase in the processing requirement of the microprocessor μP, which may require the use of a higher capability microprocessor.

Figure 3:
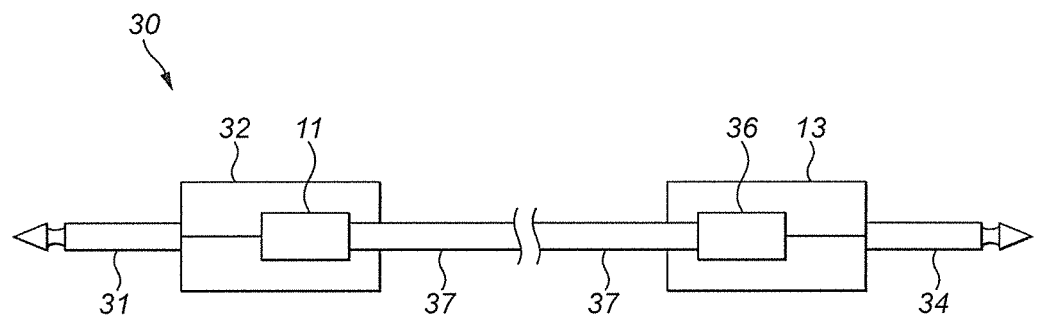
FIG. 3 is a schematic drawing of an audio signal communication cable embodying the invention.

FIG. 3 shows a cable arrangement 30 according to various aspects of the invention. A first jack includes a first metallic ¼ inch plug 31 and a corresponding body 32. Within the body of the first jack is a first device comprising the transmitter circuit 11 and a 1.5 or 1.2V battery. The transmitter circuit 11 is connected to the first plug 31 so as to be able to receive analogue electrical audio frequency signals applied thereto. The LEDs LED1 and LED2 of the transmitter circuit 11 in the first device are arranged so as to pass the light that it emits into ends of two cores of a shielded optical fibre 37, which comprises the cores Core1 and Core 2 and the Sheath of FIG. 1. At an opposite end of the optical fibre 37, a second device 36 is included in a body of a second jack, which includes a second ¼inch plug 34. The second device 36 includes the receiver circuit 13 of FIG. 1 and a 1.5 or 1.2 V battery. The photodiodes PD51 and PD52 in the second device 36 are arranged to receive light transmitted down the optical fibre 37. The electrical output of the second device 36 is provided to the second plug 34.

The cable arrangement 30 is used by mating the first plug into a signal out socket of a guitar or other sound source, and by mating the second plug 34 into a signal in socket of a mixing desk or amplification device or similar. When the guitar is played, analogue electrical audio frequency signals are provided to the conductors of the first plug, and thus are carried to the input of the transmitter circuit 11 included in the first device. The first device thus amplitude modulates the audio signal onto an optical signal at baseband, which is transmitted along the optical fibre 37. The baseband amplitude modulated optical signal is received at the second device 36, where the amplitude modulation is converted into an electrical analogue audio frequency signal and provided to the conductors of the second plug 34 and thus the amplification device or mixing desk that it is connected to. The signals produced by the audio source thus are carried to the amplification device or mixing desk without being digitised and without being transmitted along a shielded electrical cable.

Manual distortion of the prototype optical cable 37 results in no audible change in signal, since there is no signal degradation in the optical cable 37.

Since current consumption of the FIG. 1 circuits is low, batteries are able to power the transmitter and receiver circuits 11, 13 correctly for many hours before requiring replacement.

The cable arrangement 30 suffers some disadvantages compared to the conventional electrical cable arrangement. In particular, a power supply is needed at each end of the cable arrangement, whereas this is not true of the electrical cable.

The two jacks are visibly different from one another, for instance by the inclusion of arrows indicating the direction of signal transmission, or through the use of different patterning or colouring. This mitigates potential problems from connecting the cable arrangement 30 the wrong way around (the cable arrangement 30 is unidirectional, and can carry audio signals only from the first jack to the second jack). The conventional electrical cable on the other hand is bidirectional.

A break in a core of the optical cable would normally result in the ceasing of incorrect transmission, although such can also occur with conventional electrical cables.

Different audio sources produce different signal Voltages. For instance, an electric guitar produces an output signal having a maximum swing of 3 or 4 Volts, whereas certain microphones produce only 50 mV or so. Although a cable arrangement optimised for use with an electrical guitar functions also with a microphone source, the converse is not true. Also, a cable arrangement capable of handling a relatively small signal swing, for instance 100 mV, is optimised for use with microphone sources and is better able to handle microphone-originating signals without degradation. Accordingly, different cable arrangements, each optimised for a particular Voltage swing, may provide improved results than a single, all-purpose arrangement. Different cable arrangements may be optimised for different Voltage swings by the provision of different buffering and filtering arrangements prior to the INPUT terminal as shown in the circuit diagram of FIG. 1.

Figure 4:
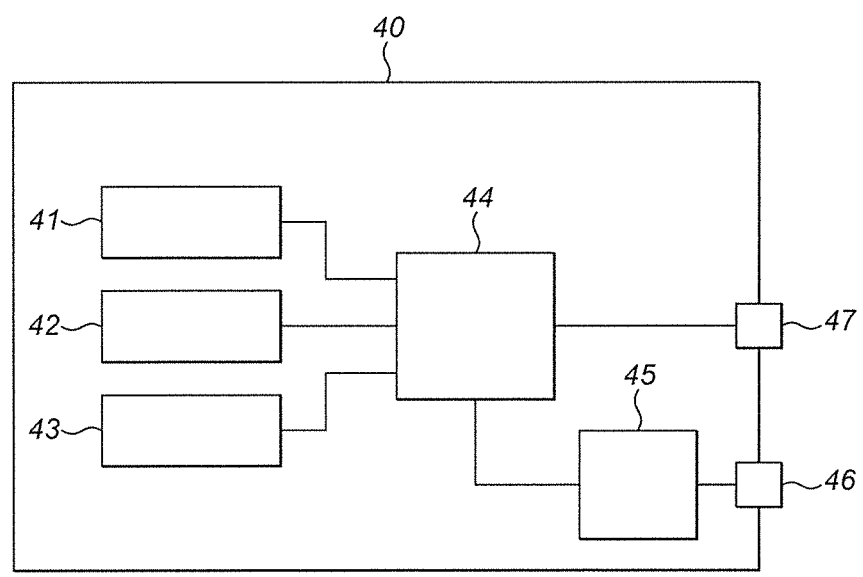
FIG. 4 is a schematic drawing of a guitar including the FIG. 2 circuitry and embodying the invention.

FIG. 4 illustrates schematically an electric guitar 40 according to aspects of the invention. The guitar includes three transducers, namely a neck humbucker 41, a middle coil 42 and a bridge humbucker 43. Each of these is connected to an electronic switching circuit 44, which includes controllable potentiometers. The switching circuit 44 provides electrical analogue signals at audio frequencies to a socket 47, with which a ¼ inch plug can be mated. The guitar thus far described is conventional.

The guitar 40 also includes a circuit 45, which comprises the FIG. 2 transmitter circuit 11. The circuit 45 is connected to receive electrical analogue signals at audio frequencies from the switching circuit 44. The circuit 45 is powered by a power source, such as a 1.5 or 1.2 V battery (not shown) included in the guitar 40. The circuit 45 amplitude modulates the electrical analogue signal onto an optical signal and provides the result to an optical connector 46 mounted on a face of the housing of the guitar 40. A dual core optical cable (not shown) is connectable into the optical connector 46, and carries the optical signal generated by the circuit 45 away from the guitar. Thus, the guitar 40 provides an optical amplitude modulated signal in the same way that a combination of a conventional guitar and the first jack of the FIG. 3 cable arrangement 30 would provide. All of the benefits stated above with relation to the previous Figures apply to this embodiment. Since it includes an electrical signal output socket 47, the guitar 40 also is usable conventionally, although this can be omitted if not required.

Figure 5:
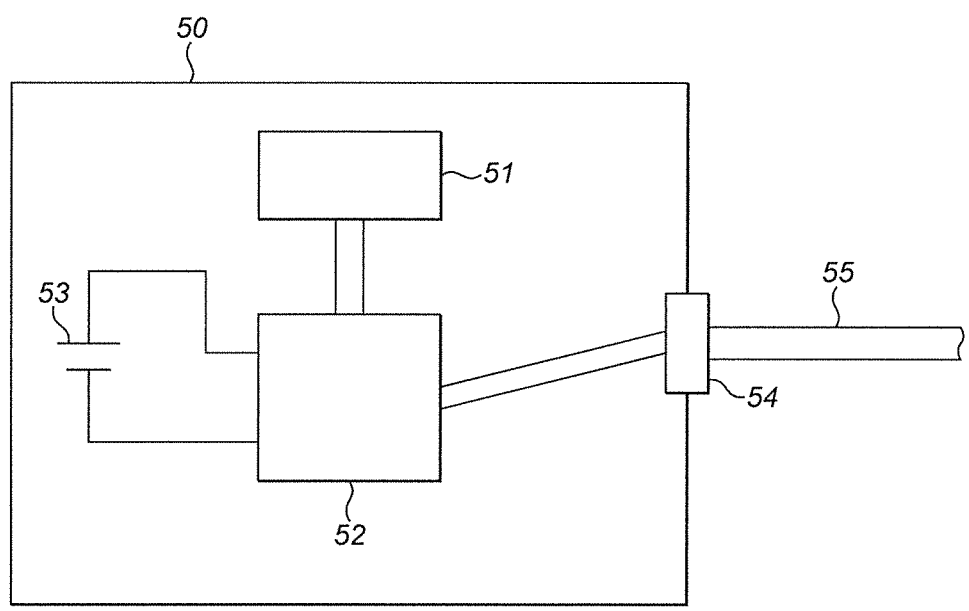
FIG. 5 is a schematic drawing of a microphone including the FIG. 2 circuitry and embodying the invention.

FIG. 5 illustrates schematically a microphone 50 according to aspects of the invention. The microphone 50 includes a microphone transducer 51, as is conventional. The microphone transducer is connected to a circuit 52, which comprises the FIG. 1A or FIG. 1B circuit, the FIG. 3 transmit circuit or similar. The circuit 52 is powered by a battery 53 The circuit 52 is connected to receive electrical analogue signals at audio frequencies from the microphone transducer 51. The circuit 52 amplitude modulates the electrical analogue signal onto an optical signal and provides the result to an optical connector 54 mounted on a face of the housing of the microphone 50. An optical cable 55 is removably or fixedly connected into the optical connector 54, and carries the optical signal generated by the circuit 52 away from the microphone 50. Thus, the microphone 59 provides an optical amplitude modulated signal in a way similar to that of the FIG. 4 guitar 40 or the FIG. 2 transmitter circuit 11.

Although the above describes that the sound source can be a guitar or microphone, the sound source may be any other type that produces analogue audio signals. The invention has most advantage with sound sources which are moved around during a performance, since these are most likely to have electrical cables damaged during use.

An additional advantage is electrical isolation. Conventional cabling includes electrical conductors. In the event of faulty amplification equipment, electrical power could be transferred through the cable to a guitar player or other person, potentially resulting in electrical shock. The same could occur in the event of a lightning strike, which may occur at outdoors concerts and the like. Using an optical fibre to convey audio signals, on the contrary, provides electrical isolation between the ends of the cable, and thus provides improved safety.

The human ear is able to perceive audio signals between 20 Hz and 20 kHz, so it is normally only those signals that are of interest to a musician or sound producer. However, the carrying also of additional signal frequencies is not precluded by the invention, as long as the content of primary interest is in the audible frequency range.

Since the signal of interest is amplitude modulated onto the optical signal, the nature of the light source is not important, as long as the amplitude of its output is controllable. The light source need not be a single frequency source, or even fixed in frequency. An LED makes a good light source because of its ease of use and low cost.

A circuit arrangement (not shown) may be added prior to the input terminal so as to provide some frequency response shaping. The arrangement may comprise plural RC circuits and a switch configured to switch in one of the RC circuits and to switch out the others. This can allow a user to select a desired frequency shaping characteristic by selecting a suitable position for the switch. The arrangement may also comprise a buffer, for instance using an op-amp, between the true input terminal and the RC circuit/switch arrangement.

The current driving of the LEDs LED1 and LED2 controlled by feedback contributes to good noise performance.

A prototype has been constructed using the arrangement 11 of FIG. 2. Performance was excellent, with a signal-to-noise ratio of 102 dB. Moreover, power consumption in the prototype is very low, giving rise to a long battery life. In tests, more than 12 hours use was achieved from an AA alkaline battery.

Although the invention has been discussed with respect to various embodiments, it should be recognized that the invention comprises the novel and non-obvious claims supported by this disclosure.

What is claimed is:

1. Apparatus comprising:
   first and second light sources;
   a first transistor having first and second main electrodes and a control electrode;
   a second transistor having first and second main electrodes and a control electrode;
   a first amplifier having first and second inputs and an output;
   a second amplifier having an input and an output;
   a third amplifier having an input and an output; and
   a bias control arrangement having an input and an output;
   wherein:
     the first light source and the first and second main electrodes of the first transistor are connected in series in a path between a positive supply terminal and a first node,
     the second light source and the first and second main electrodes of the second transistor are connected in series in a path between the first node and a negative supply terminal, the first node is connected to a second input of the first amplifier, the input of the second amplifier is connected to the output of the first amplifier, the output of the second amplifier is connected to the control input of the first transistor, the input of the third amplifier is connected to the output of the first amplifier, the output of the third amplifier is connected to the control input of the second transistor, the input of the first amplifier is connected to a signal input terminal, the input of the bias control arrangement is connected to a second node in the path through the first and second light sources and the first and second transistors, the bias control arrangement is configured to measure bias at its input and provide a control bias signal at its output, and the output of the bias control arrangement is connected to the input of each of the second and third amplifiers.

2. Apparatus as claimed in claim 1, wherein the output of the bias control arrangement is connected to the input of each of the second and third amplifiers via an arrangement comprising a fourth amplifier and a buffer.

3. Apparatus as claimed in claim 2, wherein the output of the bias control arrangement is connected to an input of the buffer, wherein an output of the buffer is connected to the input of the third amplifier and to an input of the fourth amplifier, and wherein an output of the fourth amplifier is connected to the input of the second amplifier.

4. Apparatus as claimed in claim 1, comprising a first resistor connected directly to the first node and in the path to the positive supply terminal and a second resistor connected directly to the first node and in the path to the negative supply terminal, and wherein the second node is connected to the first node by either the first resistor or the second resistor.

5. Apparatus as claimed in claim 1, wherein the bias control arrangement includes a microprocessor.

6. Apparatus as claimed in claim 5, wherein the microprocessor is configured to monitor signals received at the signal input terminal and is configured automatically to power down in response to detecting no significant input signal for a period of time.

7. Apparatus as claimed in claim 1, wherein the bias control arrangement has a second input that is connected to the input of the first amplifier, and wherein the bias control arrangement is configured to calculate the bias control signal based on instances when the level of the signal at the second input is low and to refrain from calculating the bias control signal based on instances when the level of the signal at the second input is not low.

8. Apparatus as claimed in claim 1, wherein the bias control arrangement is configured to provide at its output a pulse width modulated signal having a duty cycle that is a function of the measured bias.

9. Apparatus as claimed in claim 1, comprising an electrical connector, for instance a jack plug, for receiving an electrical input signal.

10. A cable arrangement comprising first and second devices connected by a dual core optical waveguide, wherein the first device comprises apparatus as claimed in claim 9.

11. Apparatus comprising:

first and second light sources driven respectively by second and third inverting amplifiers with feedback from the first and second light sources to provide signal content respectively on positive and negative phases of an input signal; and a bias control arrangement configured to measure a bias level of one of the light sources and to bias the second and third amplifiers based on the measured bias level.

12. Apparatus as claimed in claim 11, wherein the output of the bias control arrangement is connected to the second and third amplifiers via an arrangement comprising a fourth amplifier and a buffer.

13. Apparatus as claimed in claim 12, wherein the output of the bias control arrangement is connected to an input of the buffer, wherein an output of the buffer is connected to the input of the third amplifier and to an input of the fourth amplifier, and wherein an output of the fourth amplifier is connected to the input of the second amplifier.

14. Apparatus as claimed in claim 11, wherein the bias control arrangement includes a microprocessor.

15. Apparatus as claimed in claim 14, wherein the microprocessor is configured to monitor the input signal terminal and is configured automatically to power down in response to detecting no significant input signal for a period of time.

16. Apparatus as claimed in claim 11, wherein the bias control arrangement is configured to calculate a bias control signal provided to the second and third amplifiers based on instances when the level of the input signal is low and to refrain from calculating the bias control signal based on instances when the level of the input signal is not low.

17. Apparatus as claimed in claim 11, wherein the bias control arrangement is configured to provide to the second and third amplifiers a pulse width modulated signal having a duty cycle that is a function of the measured bias.

18. Apparatus as claimed in claim 11, comprising an electrical connector, for instance a jack plug, for receiving an electrical input signal.

19. A cable arrangement comprising first and second devices connected by a dual core optical waveguide, wherein the first device comprises apparatus as claimed in claim 18.

* * * * *